United States Patent
Amemiya

(10) Patent No.: US 8,539,833 B2
(45) Date of Patent: Sep. 24, 2013

(54) PHYSICAL AMOUNT DETECTING DEVICE

(75) Inventor: Masaki Amemiya, Minami-Minowa (JP)

(73) Assignee: Seiko Epson Corporation (JP)

( * ) Notice: Subject to any disclaimer, the term of this patent is extended or adjusted under 35 U.S.C. 154(b) by 345 days.

(21) Appl. No.: 13/018,685

(22) Filed: Feb. 1, 2011

(65) Prior Publication Data

US 2011/0232382 A1    Sep. 29, 2011

(30) Foreign Application Priority Data

Mar. 26, 2010  (JP) ................................ 2010-072459
Oct. 22, 2010  (JP) ................................ 2010-237414

(51) Int. Cl.
    *G01C 19/56*    (2012.01)

(52) U.S. Cl.
    USPC ..................................... 73/504.12; 73/504.16

(58) Field of Classification Search
    USPC ............. 73/504.12, 504.15, 504.16; 310/370
    See application file for complete search history.

(56) References Cited

U.S. PATENT DOCUMENTS

| | | | | |
|---|---|---|---|---|
| 4,896,268 A | * | 1/1990 | MacGugan | 701/502 |
| 4,996,877 A | * | 3/1991 | Stewart et al. | 73/510 |
| 5,038,613 A | * | 8/1991 | Takenaka et al. | 73/510 |
| 5,476,008 A | * | 12/1995 | Pinson | 73/504.16 |
| 5,714,698 A | * | 2/1998 | Tokioka et al. | 73/865.4 |
| 5,847,487 A | * | 12/1998 | Maeno | 310/321 |
| 5,998,911 A | * | 12/1999 | Kikuchi et al. | 310/367 |
| 6,018,212 A | * | 1/2000 | Kikuchi et al. | 310/321 |
| 6,186,003 B1 | * | 2/2001 | Kikuchi et al. | 73/504.12 |
| 6,227,048 B1 | * | 5/2001 | Kikuchi et al. | 73/504.12 |
| 6,346,765 B1 | * | 2/2002 | Kikuchi et al. | 310/367 |
| 6,437,483 B2 | * | 8/2002 | Kikuchi et al. | 310/321 |
| 6,439,051 B2 | * | 8/2002 | Kikuchi et al. | 73/504.12 |
| 6,651,498 B1 | * | 11/2003 | Kikuchi et al. | 73/504.12 |
| 6,698,292 B2 | * | 3/2004 | Kikuchi | 73/662 |
| 6,747,393 B2 | * | 6/2004 | Kikuchi et al. | 310/321 |
| 6,858,972 B2 | * | 2/2005 | Kikuchi et al. | 310/367 |
| 7,015,631 B2 | * | 3/2006 | Hirasawa et al. | 310/370 |
| 7,043,986 B2 | * | 5/2006 | Kikuchi et al. | 73/504.12 |
| 7,150,386 B2 | * | 12/2006 | Ishikawa et al. | 228/4.5 |
| 7,168,289 B2 | * | 1/2007 | Kikuchi | 73/1.37 |
| 7,237,169 B2 | * | 6/2007 | Smith | 714/742 |
| 7,255,005 B2 | * | 8/2007 | Ogura | 73/504.12 |

(Continued)

FOREIGN PATENT DOCUMENTS

| | | |
|---|---|---|
| JP | 2005-062160 | 3/2005 |
| JP | 2008-026110 | 2/2008 |
| JP | 2008058062 A | 3/2008 |

*Primary Examiner* — Peter Macchiarolo
*Assistant Examiner* — Samir M Shah
(74) *Attorney, Agent, or Firm* — Harness, Dickey & Pierce, P.L.C.

(57) ABSTRACT

A physical amount detecting device includes: one pair of driving vibration arms are bending-vibrated in a direction of a X-axis, one pair of first detection vibration arms and one pair of second detection vibration arms are vibrated in a direction of a Y axis, depending on a Coriolis force that is generated in accordance with rotational angular velocity of X-axis rotation, the one pair of the first detection vibration arms are bending-vibrated with a first phase in a direction of a Z axis in addition to vibration in the direction of the Y axis, and the one pair of the second detection vibration arms are bending-vibrated with a second phase, which is a phase opposite to the first phase, in the direction of the Z axis in addition to vibration in the direction of the Y axis.

6 Claims, 12 Drawing Sheets

(56) References Cited

U.S. PATENT DOCUMENTS

| | | | |
|---|---|---|---|
| 7,299,695 B2* | 11/2007 | Tanaka et al. | 73/510 |
| 7,334,473 B2* | 2/2008 | Hayashi et al. | 73/504.12 |
| 7,412,885 B2* | 8/2008 | Ogura | 73/504.12 |
| 7,814,792 B2* | 10/2010 | Tateyama et al. | 73/504.12 |
| 8,117,913 B2* | 2/2012 | Terada | 73/504.12 |
| 8,375,790 B2* | 2/2013 | Sato et al. | 73/504.12 |
| 2005/0284223 A1 | 12/2005 | Karaki et al. | |
| 2006/0226741 A1* | 10/2006 | Ogura et al. | 310/366 |

* cited by examiner

PHYSICAL AMOUNT DETECTING DEVICE

BACKGROUND

1. Technical Field

The present invention relates to a physical amount detecting device, a physical amount detecting apparatus, and an electronic apparatus.

2. Related Art

As angular velocity sensors used for detecting the rotation angular velocity of a rotation system, vibration-type piezoelectric gyroscopes are used in which a piezoelectric vibrating reed is housed in a container. The vibration-type gyroscopes are used for detecting shaking and the like in car navigation systems and still cameras.

As the piezoelectric vibrating reeds used in the vibration-type piezoelectric gyroscopes, for example, double T-type piezoelectric vibrating reeds, which, for example, have a thickness in the Z-axis direction, including: one pair of connection arms that extend from a base portion to both sides along the X axis; one pair of detection vibration arms that extend from the base portion to both sides along the Y axis; and one driving vibration arm that extends from each connection arm to both sides along the Y axis can be used (for example, see JP-A-2005-62160). Such double T-type piezoelectric vibrating reeds can detect the angular velocity of Z-axis rotation through performing a bending vibration of the driving vibration arm on the XY plane.

SUMMARY

An advantage of some aspects of the invention is that it provides a physical amount detecting device that has a double T-type piezoelectric vibrating reed having a thickness in the Z-axis direction and can detect the angular velocity of X-axis rotation. In addition, another advantage of some aspects of the invention is that it provides a physical amount detecting apparatus that includes the physical amount detecting device.

The invention can be implemented as the following forms or application examples.

Application Example 1

According to this application example, there is provided a physical amount detecting device including: a base portion; one pair of connection arms that extend from the base portion in opposite directions along an X axis; one pair of driving vibration arms that extend from the base portion in opposite directions along a Y axis; one pair of first detection vibration arms that extend from one of the one pair of connection arms in opposite directions along the Y axis; and one pair of second detection vibration arms that extend from the other of the one pair of connection arms in opposite directions along the Y axis. One and the other of the one pair of the driving vibration arms are bending-vibrated with opposite phases in a direction of the X-axis, the one pair of the first detection vibration arms and the one pair of the second detection vibration arms are vibrated with opposite phases in a direction of the Y axis in accordance with the bending vibration of the one pair of driving vibration arms. In addition, depending on a Coriolis force that is generated in accordance with rotational angular velocity of X-axis rotation, one and the other of the one pair of the first detection vibration arms are bending-vibrated with a first phase in a direction of a Z axis in addition to vibration in the direction of the Y axis, and one and the other of the one pair of the second detection vibration arms are bending-vibrated with a second phase, which is a phase opposite to the first phase, in the direction of the Z axis in addition to vibration in the direction of the Y axis.

According to the above-described physical amount detecting device, a double T-type piezoelectric vibrating reed that is thick in the direction of the Z axis is included, and the angular velocity of the X-axis rotation can be detected.

Application Example 2

This application example is directed to the physical amount detecting device according to Application Example 1 which further includes: a driving signal electrode that is used for bending vibration of the one pair of driving vibration arms; a driving ground electrode that forms a pair with the driving signal electrode; a first detection signal electrode that is used for obtaining a detection signal from the one pair of the first detection vibration arms; a first detection ground electrode that forms a pair with the first detection signal electrode; a second detection signal electrode that is used for obtaining a detection signal from the one pair of the second detection vibration arms; and a second detection ground electrode that forms a pair with the second detection signal electrode. The base portion, the one pair of connection arms, the one pair of driving vibration arms, the one pair of the first detection vibration arms, and the one pair of the second detection vibration arms configure a piezoelectric vibrating reed. The piezoelectric vibrating reed has a first primary face and a second primary face that are front and rear faces along a plane defined by the X axis and the Y axis, the one pair of driving vibration arms has a first side face that connects the first primary face and the second primary face and a second side face that connects the first primary face and the second primary face and is located on a side opposite to the first side face, the one pair of the first detection vibration arms has a third side face that connects the first primary face and the second primary face and faces the first side face and a fourth side face that connects the first primary face and the second primary face and is located on a side opposite to the third side face, and the one pair of the second detection vibration arms has a fifth side face that connects the first primary face and the second primary face and faces the second side face and a sixth side face that connects the first primary face and the second primary face and is located on a side opposite to the fifth side face. In addition, the driving signal electrode is formed on the first and second primary faces of one of the one pair of the driving vibration arms and the first and second side faces of the other of the one pair of driving vibration arms, the driving ground electrode is formed on the first and second side faces of one of the one pair of driving vibration arms and the first and second primary faces of the other of the one pair of driving vibration arms, the first detection signal electrode is formed on the first primary face side of the fourth side face and the second primary face side of the third side face, the first detection ground electrode is formed on the first primary face side of the third side face and the second primary face side of the fourth side face, the second detection signal electrode is formed on the first primary face side of the fifth side face and the second primary face side of the sixth side face, and the second detection ground electrode is formed on the first primary face side of the sixth side face and the second primary face side of the fifth side face.

According to the above-described physical amount detecting device, a double T-type piezoelectric vibrating reed that is thick in the direction of the Z axis is included, and the angular velocity of the X-axis rotation can be detected.

Application Example 3

This application example is directed to the physical amount detecting device according to Application Example 1, which further includes: a driving signal electrode that is used for bending vibration of the one pair of driving vibration arms; a driving ground electrode that forms a pair with the driving signal electrode; a first detection signal electrode that is used for obtaining a detection signal from the one pair of the first detection vibration arms; a first detection ground electrode that forms a pair with the first detection signal electrode; a second detection signal electrode that is used for obtaining a detection signal from the one pair of the second detection vibration arms; and a second detection ground electrode that forms a pair with the second detection signal electrode. The base portion, the one pair of connection arms, the one pair of driving vibration arms, the one pair of the first detection vibration arms, and the one pair of the second detection vibration arms configure a piezoelectric vibrating reed. In addition, the piezoelectric vibrating reed has a first primary face and a second primary face that are front and rear faces along a plane defined by the X axis and the Y axis, the one pair of driving vibration arms has a first side face that connects the first primary face and the second primary face and a second side face that connects the first primary face and the second primary face and is located on a side opposite to the first side face, the one pair of the first detection vibration arms has a third side face that connects the first primary face and the second primary face and faces the first side face and a fourth side face that connects the first primary face and the second primary face and is located on a side opposite to the third side face, and the one pair of the second detection vibration arms has a fifth side face that connects the first primary face and the second primary face and faces the second side face and a sixth side face that connects the first primary face and the second primary face and is located on a side opposite to the fifth side face. In addition, a first groove is formed on the first primary face of the one pair of driving vibration arms, a second groove is formed on the second primary face of the one pair of driving vibration arms, a third groove is formed on the first primary face of the one pair of the first detection vibration arms, a fourth groove is formed on the second primary face of the one pair of the first detection vibration arms, a fifth groove is formed on one the first primary face of the one pair of the second detection vibration arms, a sixth groove is formed on the second primary face of the one pair of the second detection vibration arms, the driving signal electrode is formed on inner faces of the first and second grooves of one of the one pair of driving vibration arms and the first and second side faces of the other of the one pair of driving vibration arms, the driving ground electrode is formed on the first and second side faces of one of the one pair of driving vibration arms and the inner faces of the first and second grooves of the other of the one pair of driving vibration arms, the first detection signal electrode is formed on the first primary face side of the fourth side face, the second primary face side of the third side face, an inner face of the third groove that is located on the third side face side, and an inner face of the fourth groove that is located on the fourth side face side, the first detection ground electrode is formed on the first primary face side of the third side face, the second primary face side of the fourth side face, the inner face of the third groove that is located on the fourth side face side, and the inner face of the fourth groove that is located on the third side face side, the second detection signal electrode is formed on the first primary face side of the fifth side face, the second primary face side of the sixth side face, an inner face of the fifth groove that is located on the sixth side face side, and an inner face of the sixth groove that is located on the fifth side face side, and the second detection ground electrode is formed on the first primary face side of the sixth side face, the second primary face side of the fifth side face, the inner face of the fifth groove that is located on the fifth side face side, and the inner face of the sixth groove that is located on the sixth side face side.

According to the above-described physical amount detecting device, electrodes can be formed on the inner faces of the first to sixth grooves, and whereby the CI (crystal impedance) value can be decreased.

Application Example 4

This application example is directed to the physical amount detecting device according to Application 2 or 3, wherein the first detection signal electrode and the first detection ground electrode face each other through the first detection driving arm, and the second detection signal electrode and the second detection ground electrode face each other through the second detection driving arm.

According to the above-described physical amount detecting device, electric charge generated between the first detection signal electrode and the first detection ground electrode and electric charges generated between the second detection signal electrode and the second detection ground electrode can be effectively obtained as detection signals.

Application Example 5

According to this application example, there is provided a physical amount detecting apparatus including: the physical amount detecting device according to any one of Application Examples 1 to 4; a package in which the physical amount detecting device is housed; and an IC chip that is used for controlling the physical amount detecting device.

According to the above-described physical amount detecting apparatus, the angular velocity of the X-axis rotation can be detected.

Application Example 6

According to this application example, there is provided an electronic apparatus including the physical amount detecting device according to any one of Application Examples 1 to 4.

According to the above-described electronic apparatus, the angular velocity of the X-axis rotation can be detected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings.

1. Physical Amount Detecting Device

Figure 1:
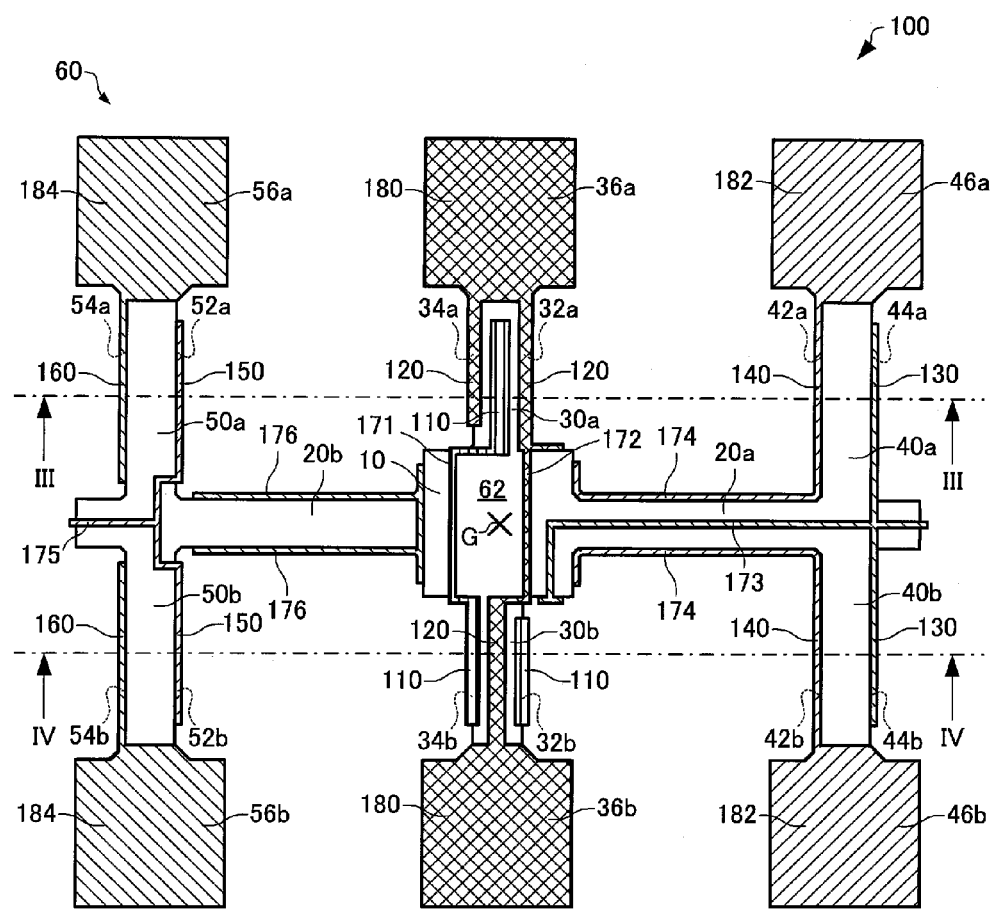
FIG. 1 is a diagram illustrating the configuration of the first primary face side of a physical amount detecting device according to an embodiment of the invention.
Figure 2:
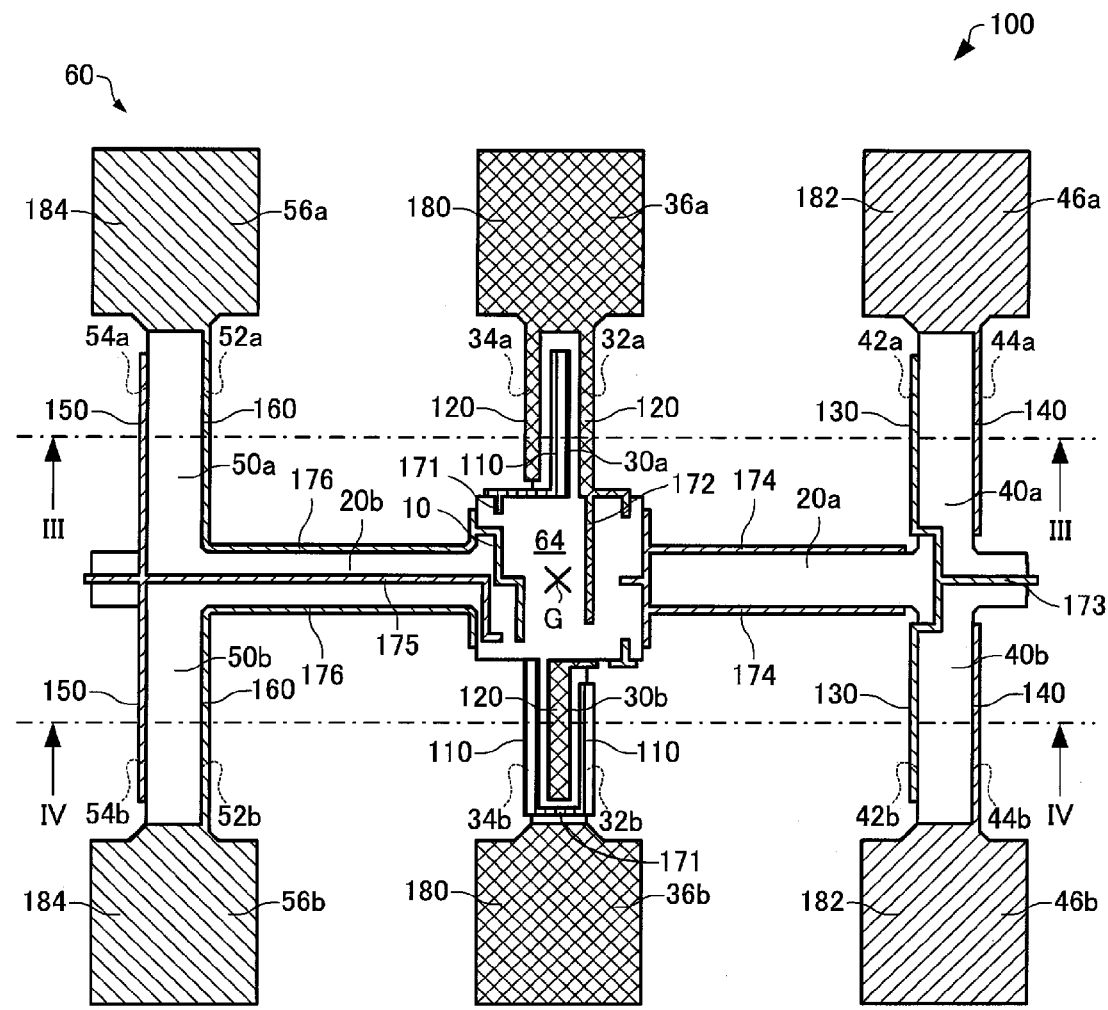
FIG. 2 is a diagram illustrating the configuration of the second primary face side of the physical amount detecting device according to the embodiment.
Figure 2:
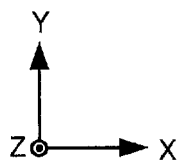
Figure 3:
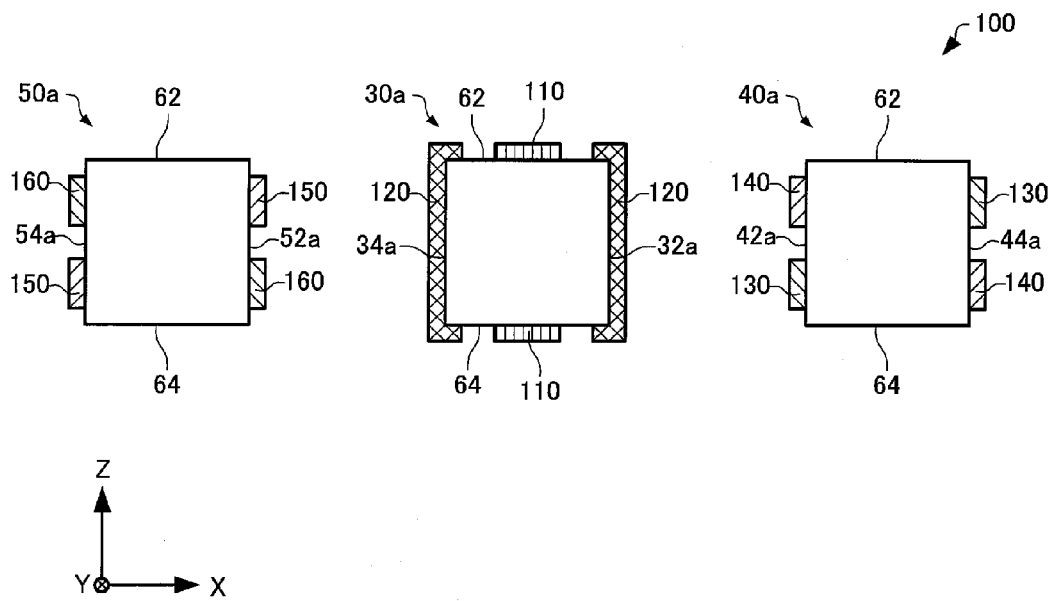
FIG. 3 is a cross-sectional view schematically showing the physical amount detecting device according to the embodiment.
Figure 4:
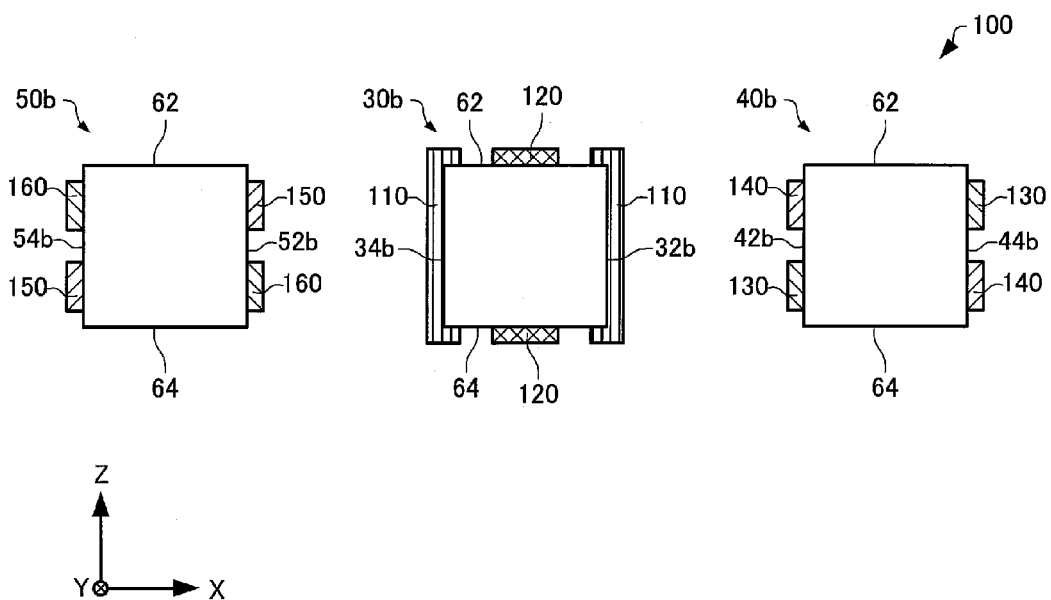
FIG. 4 is a cross-sectional view schematically showing the physical amount detecting device according to the embodiment.

First, a physical amount detecting device 100 according to an embodiment of the invention will be described with reference to the drawings. FIG. 1 is a plan view of the physical amount detecting device 100 viewed from the first primary face 62 side that is one primary face and is a diagram illustrating the configuration of the first primary face 62 side of the physical amount detecting device 100. FIG. 2 is a perspective view of the physical amount detecting device 100 viewed from the first primary face 62 side and is a diagram illustrating the configuration of the second primary face 64 side that is the other primary face of the physical amount detecting device 100. FIG. 3 is a cross-sectional view schematically showing the physical amount detecting device 100 that is taken along line III-III shown in FIGS. 1 and 2. FIG. 4 is a cross-sectional view schematically showing the physical amount detecting device 100 that is taken along line IV-IV shown in FIGS. 1 and 2.

As shown in FIGS. 1 to 4, the physical amount detecting device 100 includes a piezoelectric vibrating reed 60 and electrodes formed in the piezoelectric vibrating reed 60. Hereinafter, the description will be presented in the order of the piezoelectric vibrating reed 60, the electrodes formed in the piezoelectric vibrating reed 60, and the operation of the piezoelectric vibrating reed 60.

1.1. Piezoelectric Vibrating Reed

First, the material, the shape, and the like of the piezoelectric vibrating reed 60 will be described. As the material of the piezoelectric vibrating reed 60, for example, a piezoelectric single crystal such as crystal, lithium tantalate, or lithium niobate or a piezoelectric material such as a piezoelectric ceramic including zirconate titanate can be used. The piezoelectric vibrating reed 60 may have a structure in which a piezoelectric thin film formed from zinc oxide or aluminum nitride pinched into the electrodes is formed on a part of the surface of a silicon semiconductor.

Hereinafter, an example will be described in which a so-called double T-type piezoelectric vibrating reed formed from a crystal substrate is used as the piezoelectric vibrating reed 60. The piezoelectric vibrating reed 60 formed from the crystal substrate has a small variance in the resonant frequency according to changes in the temperature, and accordingly, the accuracy of detection of the angular velocity can be improved.

The crystal configuring the crystal substrate has an X axis that is termed the electric axis, a Y axis that is termed the mechanical axis, and a Z axis that is termed the optical axis. The piezoelectric vibrating reed 60, for example, is formed from a Z-cut crystal substrate that is cut in the direction of the XY plane defined by the X axis and the Y axis. In other words, as shown in FIGS. 1 to 4, the piezoelectric vibrating reed 60 is thick in the Z-axis direction, and the planar shape of the piezoelectric vibrating reed 60 is expanded in the XY plane in accordance with the crystal axis of the crystal. The piezoelectric vibrating reed 60 has the first primary face 62 and the second primary face 64 that have the relationship of front and rear faces. The first primary face 62 and the second primary face 64 are faces formed along the XY plane.

As shown in FIGS. 1 to 4, the piezoelectric vibrating reed 60 includes: a base portion 10; one pair of connection arms 20a and 20b; one pair of the driving vibration arms 30a and 30b; one pair of the first detection vibration arms 40a and 40b; and one pair of second detection vibration arms 50a and 50b.

The base portion 10 has a center point G of the piezoelectric vibrating reed 60. The center point G can be regarded as a center position of the piezoelectric vibrating reed 60. The piezoelectric vibrating reed 60, for example, has a shape that has point symmetry with respect to the center point G. Accordingly, the piezoelectric vibrating reed 60 can be balanced well. The shape of the base portion 10 is not particularly limited. For example, the shape of the base portion 10 may be an approximate rectangle having end faces (side faces) parallel to the YZ plane and the XZ plane. From the end face parallel to the YZ plane, the connection arms 20a and 20b can be extended, and from the end face parallel to the XZ plane, the driving vibration arms 30a and 30b can be extended.

The one pair of the connection arms 20a and 20b extends in opposite directions along the X axis from the base portion 10. In the example shown in the figure, one connection arm 20a extends in the positive X-axis direction (the direction of an arrow in the X axis), and the other connection arm 20b extends in the negative X-axis direction.

The one pair of the driving vibration arms 30a and 30b, as shown in FIGS. 1 and 2, extends in opposite directions along the Y-axis from the base portion 10. In the example shown in the figure, one 30a of the driving vibration arms extends in the positive Y-axis direction (the direction of an arrow in the Y axis), and the other 30b of the driving vibration arms extends in the negative Y-axis direction. In the example shown in FIGS. 3 and 4, the shape of the cross-sections of the driving vibration arms 30a and 30b is approximately rectangular. The driving vibration arm 30a has a first side face 32a and a second side face 34a that connect the first primary face 62 and the second primary face 64. Similarly, the driving vibration arm 30b has the first side face 32b and the second side face 34b that connect the first primary face 62 and the second primary face 64. The first side faces 32a and 32b, for example, are side faces on the positive X-axis side. The second side faces 34a and 34b, for example, are side faces on the negative Y-axis side and are faces on the opposite sides of the first side faces 32a and 32b.

The one pair of the first detection vibration arms 40a and 40b, as shown in FIGS. 1 and 2, extends in opposite directions along the Y-axis from near the tip end portion of the connection arm 20a. In the example shown in the figure, one 40a of the first detection vibration arms extends in the positive Y-axis direction, and the other 40b of the first detection vibration arms extends in the negative Y-axis direction. In the example shown in FIGS. 3 and 4, the shape of the cross-sections of the first detection vibration arms 40a and 40b is approximately rectangular. The first detection vibration arm 40a has a third side face 42a and a fourth side face 44a that connect the first primary face 62 and the second primary face 64. Similarly, the first detection vibration arm 40b has the third side face 42b and the fourth side face 44b that connect the first primary face 62 and the second primary face 64. The third side faces 42a and 42b are faces facing the first side faces 32a and 32b. The fourth side faces 44a and 44b are faces on the opposite sides of the third side faces 42a and 42b.

The one pair of the second detection vibration arms 50a and 50b, as shown in FIGS. 1 and 2, extends in opposite directions along the Y-axis from near the tip end portion of the connection arm 20b. In the example shown in the figure, one 50a of the second detection vibration arms extends in the positive Y-axis direction, and the other 50b of the second detection vibration arm extends in the negative Y-axis direction. In the example shown in FIGS. 3 and 4, the shape of the cross-sections of the second detection vibration arms 50a and 50b is approximately rectangular. The second detection vibration arm 50a has the fifth side face 52a and the sixth side face 54a that connect the first primary face 62 and the second primary face 64. Similarly, the second detection vibration arm 50b has the fifth side face 52b and the sixth side face 54b that connect the first primary face 62 and the second primary face 64. The fifth side faces 52a and 52b are faces facing the second side faces 34a and 34b. The sixth side faces 54a and 54b are faces located on the opposite sides of the fifth side faces 52a and 52b.

In addition, the piezoelectric vibrating reed 60, as shown in FIGS. 1 and 2, may include spindle portions 36a, 36b, 46a, 46b, 56a, and 56b. The spindle portions 36a, 36b, 46a, 46b, 56a, and 56b are respectively formed on the tip end portions of the vibration arms 30a, 30b, 40a, 40b, 50a, and 50b. The width (size in the X-axis direction) of the spindle portions 36a, 36b, 46a, 46b, 56a, and 56b is larger than that of the vibration arms 30a, 30b, 40a, 40b, 50a, and 50b. Owing to the spindle portions 36a and 36b formed on the tip end portions of the driving vibration arms 30a and 30b, the physical amount detecting device 100 increases the Coriolis force and can attain a desired resonant frequency with a relatively short (size in the Y-axis direction is small) driving vibration arm. In addition, owing to the spindle portions 46a, 46b, 56a, and 56b formed on the tip end portions of the detection vibration arms 40a, 40b, 50a, and 50b, the electric charge generated in detection signal electrodes can be increased, and accordingly, the detection sensitivity of the angular velocity can be improved.

Here, FIGS. 3 and 4 are schematic diagrams, and the cross-sectional shapes are represented as approximately rectangular. However, the cross-sectional shapes are not limited to precise rectangles. In other words, when the piezoelectric vibrating reed 60 is formed by wet etching processing, due to anisotropy of the etching speed, there are cases where the cross-sectional shapes of the driving vibration arms 30a and 30b, the first detection vibration arms 40a and 40b, and the second detection vibration arms 50a and 50b are not precise rectangles, and specific portions of the side faces of the driving vibration arms 30a and 30b, the first detection vibration arms 40a and 40b, and the second detection vibration arms 50a and 50b are convex portions. In addition, a shape in which concave-convex is formed on the first primary face 62 and the second primary face 64 may be used.

1.2. Electrodes

Next, electrodes formed in the piezoelectric vibrating reed 60 will be described. The physical amount detecting device 100, as shown in FIGS. 1 to 4, includes: a driving signal electrode 110; a driving ground electrode 120; the first detection signal electrode 130; the first detection ground electrode 140; the second detection signal electrodes 150; and the second detection ground electrode 160.

In addition, the physical amount detecting device 100 may include: a first wiring 171 that is connected to the driving signal electrode 110; a second wiring 172 that is connected to the driving ground electrode 120; a third wiring 173 that is connected to the first detection signal electrode 130; a fourth wiring 174 that is connected to the first detection ground electrode 140; a fifth wiring 175 that is connected to the second detection signal electrode 150; and a sixth wiring 176 that is connected to the second detection ground electrode 160.

Furthermore, the physical amount detecting device 100 may include: a first spindle portion electrode 180 that is connected to the driving ground electrode 120; a second spindle portion electrode 182 that is connected to the first detection ground electrode 140; and a third spindle portion electrode 184 that is connected to the second detection ground electrode 160.

(1) Driving Signal Electrode 110 and Driving Ground Electrode 120

The driving signal electrode 110 and the driving ground electrode 120 are electrodes that are used for allowing the driving vibration arms 30a and 30b to perform bending vibration. The driving signal electrode 110 is an electrode that is used for applying a driving signal to the driving vibration arms 30a and 30b. The driving ground electrode 120 forms a pair with the driving signal electrode 110 and is applied with the ground electric potential.

The driving signal electrode 110, as shown in FIGS. 1 to 4, is formed on the first primary face 62 and the second primary face 64 of the driving vibration arm 30a and the first side face 32b and the second side face 34b of the driving vibration arm 30b. In the example shown in the figure, the driving signal electrode 110 is formed so as to cover the first side face 32b and the second side face 34b of the driving vibration arm 30b.

The driving signal electrode 110 formed on the first primary face 62 of the driving vibration arm 30a and the driving signal electrode 110 formed on the second primary face 64 of the driving vibration arm 30a, as shown in FIGS. 1 and 2, for example, are electrically connected to each other through the first wiring 171 formed on the side face (a face connecting the first primary face 62 and the second primary face 64) of the base portion 10.

The driving signal electrode 110 formed on the first side face 32b of the driving vibration arm 30b and the driving signal electrode 110 formed on the second side face 34b of the driving vibration arm 30b, for example, as shown in FIG. 2, are electrically connected to each other through the first wiring 171 that is formed on the second primary face 64 of the driving vibration arm 30b.

The driving signal electrode 110 formed on the driving vibration arm 30a and the driving signal electrode 110 formed on the driving vibration arm 30b, for example, as shown in FIG. 1, are electrically connected to each other through the first wiring 171 formed on the first primary face 62 of the base portion 10.

The driving ground electrode 120, as shown in FIGS. 1 to 4, is formed on the first side face 32a and the second side face 34a of the driving vibration arm 30a and the first primary face 62 and the second primary face 64 of the driving vibration arm 30b. In the example shown in the figure, the driving ground electrode 120 is formed so as to cover the first side face 32a and the second side face 34a of the driving vibration arm 30a.

The driving ground electrode 120 that is formed on the first side face 32a of the driving vibration arm 30a and the driving ground electrode 120 that is formed on the second side face 34a of the driving vibration arm 30a, as shown in FIGS. 1 and 2, are electrically connected to each other, for example, through the first spindle portion electrode 180 that is formed on a spindle portion 36a.

The driving ground electrode 120 that is formed on the first primary face 62 of the driving vibration arm 30b and the driving ground electrode 120 that is formed on the second primary face 64 of the driving vibration arm 30b are electrically connected to each other, for example, through the second wiring 172 that is formed on the side face of the base portion 10. In the example shown in FIG. 1, the driving ground electrode 120 that is formed on the first primary face 62 of the driving vibration arm 30b is connected to the first spindle portion electrode 180 formed on the spindle portion 36b.

The driving ground electrode 120 that is formed on the driving vibration arm 30a and the driving ground electrode 120 that is formed on the driving vibration arm 30b, as shown in FIG. 1, are electrically connected to each other, for example, through the second wiring 172 that is formed on the first primary face 62 of the base portion 10.

The first wiring 171 and the second wiring 172, for example, are electrically connected to a driving circuit (it will be described later in detail). Accordingly, a driving signal can be applied by applying a voltage between the driving signal electrode 110 and the driving ground electrode 120 from the driving circuit.

(2) First Detection Signal Electrode 130 and First Detection Ground Electrode 140

The first detection signal electrode 130 and the first detection ground electrode 140 are electrodes that are used for acquiring detection signals of the first detection vibration arms 40a and 40b. In other words, the vibration generated in the first detection vibration arms 40a and 40b appears as electric charge in the first detection signal electrode 130 and can be extracted as a detection signal by a detection circuit (it will be described in detail later). The first detection ground electrode 140 forms a pair with the first detection signal electrode 130 and is applied with the ground electric potential.

The first detection signal electrode 130, as shown in FIGS. 1 to 4, is formed on the first primary face 62 side of the fourth side faces 44a and 44b and the second primary face 64 side of the third side faces 42a and 42b. The first detection ground electrode 140 is formed on the first primary face 62 side of the third side faces 42a and 42b and the second primary face 64 side of the fourth side faces 44a and 44b.

The first detection signal electrode 130 formed on the first primary face 62 side of the fourth side faces 44a and 44b and the first detection ground electrode 140 formed on the first primary face 62 side of the third side faces 42a and 42b, for example, face each other through the first detection vibration arm 40a or the first detection vibration arm 40b. Similarly, the first detection signal electrode 130 formed on the second primary face 64 side of the third side faces 42a and 42b and the first detection ground electrode 140 formed on the second primary face 64 side of the fourth side faces 44a and 44b, for example, face each other through the first detection vibration arm 40a or the first detection vibration arm 40b. Accordingly, electric charge that is generated between the first detection signal electrode 130 and the first detection ground electrode 140 can be efficiently acquired as a detection signal.

The first detection signal electrode 130 formed on the first primary face 62 side of the fourth side faces 44a and 44b and the first detection signal electrode 130 formed on the second primary face 64 side of the third side faces 42a and 42b, for example, are electrically connected to each other through the third wiring 173. In the example shown in the figure, the third wiring 173 is formed on the primary faces 62 and 64 and the side faces of the connection arm 20a and the primary faces 62 and 64 and the side faces of the base portion 10.

The first detection ground electrode 140 formed on the first primary face 62 side of the third side faces 42a and 42b and the first detection ground electrode 140 formed on the second primary face 64 side of the fourth side faces 44a and 44b, for example, are electrically connected to each other through the fourth wiring 174 and the second spindle portion electrode 182. The fourth wiring 174, for example, is formed on the side face of the connection arm 20a and the second primary face 64 and the side face of the base portion 10. The second spindle portion electrode 182, for example, is formed on the spindle portions 46a and 46b.

The third wiring 173 and the fourth wiring 174, for example, are electrically connected to the detection circuit. Accordingly, the detection circuit can acquire a detection signal from the first detection signal electrode 130.

(3) Second Detection Signal Electrode 150 and Second Detection Ground Electrode 160

The second detection signal electrode 150 and the second detection ground electrode 160 are electrodes that are used for acquiring detection signals of the second detection vibration arms 50a and 50b. In other words, the vibration generated in the second detection vibration arms 50a and 50b appears as electric charge in the second detection signal electrode 150 and can be extracted as a detection signal by the detection circuit. The second detection ground electrode 160 forms a pair with the second detection signal electrode 150 and is applied with the ground electric potential.

The second detection signal electrode 150, as shown in FIGS. 1 to 4, is formed on the first primary face 62 side of the fifth side faces 52a and 52b and the second primary face 64 side of the sixth side faces 54a and 54b. The second detection ground electrode 160 is formed on the first primary face 62 side of the sixth side faces 54a and 54b and the second primary face 64 side of the fifth side faces 52a and 52b.

The second detection signal electrode 150 formed on the first primary face 62 side of the fifth side faces 52a and 52b and the second detection ground electrode 160 formed on the first primary face 62 side of the sixth side faces 54a and 54b, for example, face each other through the second detection vibration arm 50a or the second detection vibration arm 50b. Similarly, the second detection signal electrode 150 formed on the second primary face 64 side of the sixth side faces 54a and 54b and the second detection ground electrode 160 formed on the second primary face 64 side of the fifth side faces 52a and 52b, for example, face each other through the second detection vibration arm 50a or the second detection vibration arm 50b. Accordingly, electric charge that is generated between the second detection signal electrode 150 and the second detection ground electrode 160 can be efficiently acquired as a detection signal.

The second detection signal electrode 150 formed on the first primary face 62 side of the fifth side faces 52a and 52b and the second detection signal electrode 150 formed on the second primary face 64 side of the sixth side faces 54a and 54b, for example, are electrically connected to each other through the fifth wiring 175. In the example shown in the figure, the fifth wiring 175 is formed on the primary faces 62 and 64 and the side faces of the connection arm 20b and the primary face 64 of the base portion 10.

The second detection ground electrode 160 formed on the first primary face 62 side of the sixth side faces 54a and 54b and the second detection ground electrode 160 formed on the second primary face 64 side of the fifth side faces 52a and 52b, for example, are electrically connected to each other through the sixth wiring 176 and the third spindle portion electrode 184. The sixth wiring 176, for example, is formed on the side face of the connection arm 20b and the second primary face 64 and the side face of the base portion 10. The third spindle portion electrode 184, for example, is formed on the spindle portions 56a and 56b.

The fifth wiring 175 and the sixth wiring 176, for example, are electrically connected to the detection circuit. Accordingly, the detection circuit can acquire a detection signal from the second detection signal electrode 150.

In addition, as the electrodes 110, 120, 130, 140, 150, 160, 180, 182, and 184 and wirings 171, 172, 173, 174, 175, and 176, for example, a laminated body that is laminated in the order of chromium and gold from the piezoelectric vibrating reed 60 side or the like can be used. The electrodes 110, 120, 130, 140, 150, 160, 180, 182, and 184 and wirings 171, 172, 173, 174, 175, and 176, for example, are formed by patterning a conductive layer (not shown in the figure), which is formed as a film by using a sputtering method or the like, using photolithographic technology, etching technology, and the like. For example, the electrodes and the wirings that are formed on the side faces are formed by patterning using diagonal exposure or the like.

1.3. Operation of Piezoelectric Vibrating Reed

Next, the operation of the piezoelectric vibrating reed 60 will be described. FIGS. 5 to 8 are diagrams illustrating the operation of the piezoelectric vibrating reed 60.

First, in order to perform bending vibration of the driving vibration arms 30a and 30b, an AC voltage is applied between the driving signal electrode 110 and the driving ground electrode 120 as a driving signal.

Figure 5:
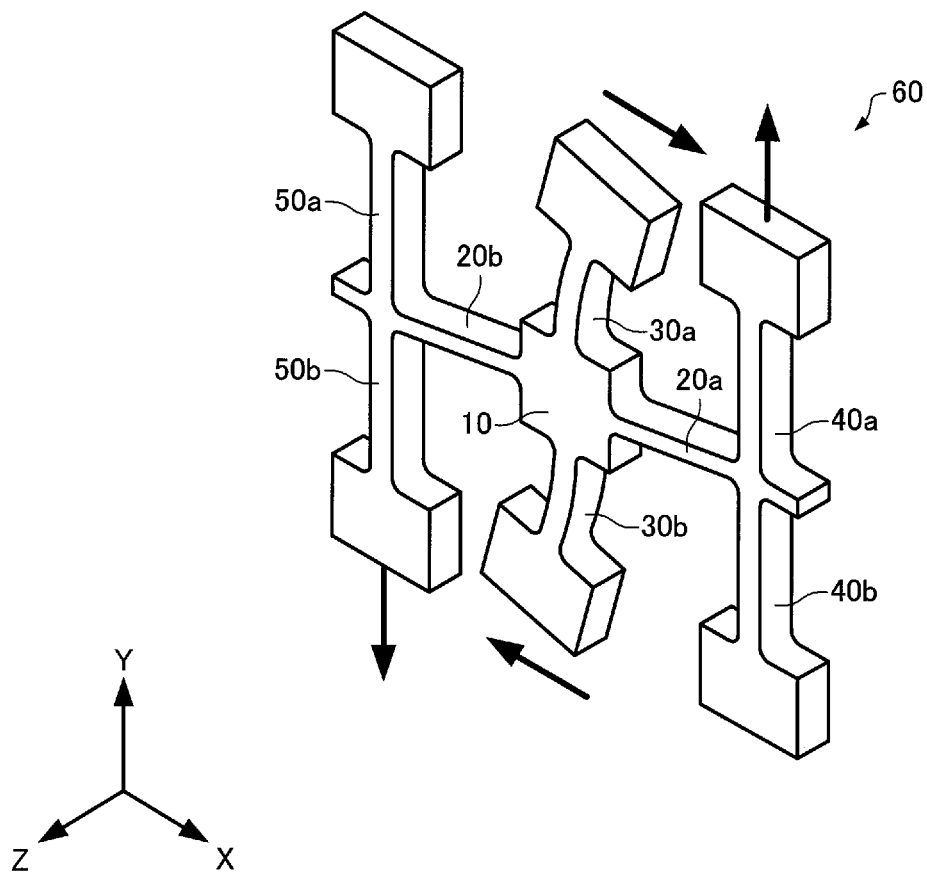
FIG. 5 is a diagram showing the operation of a piezoelectric vibrating reed of the physical amount detecting device according to the embodiment.

For example, in a case where a positive voltage is applied to the driving signal electrode 110 with respect to the driving ground electrode 120, as shown in FIG. 5, the driving vibration arm 30a bends in the positive X-axis direction with the base portion 10 used as a support portion, and the driving vibration arm 30b bends in the negative X-axis direction with the base portion 10 used as a support portion.

Figure 6:
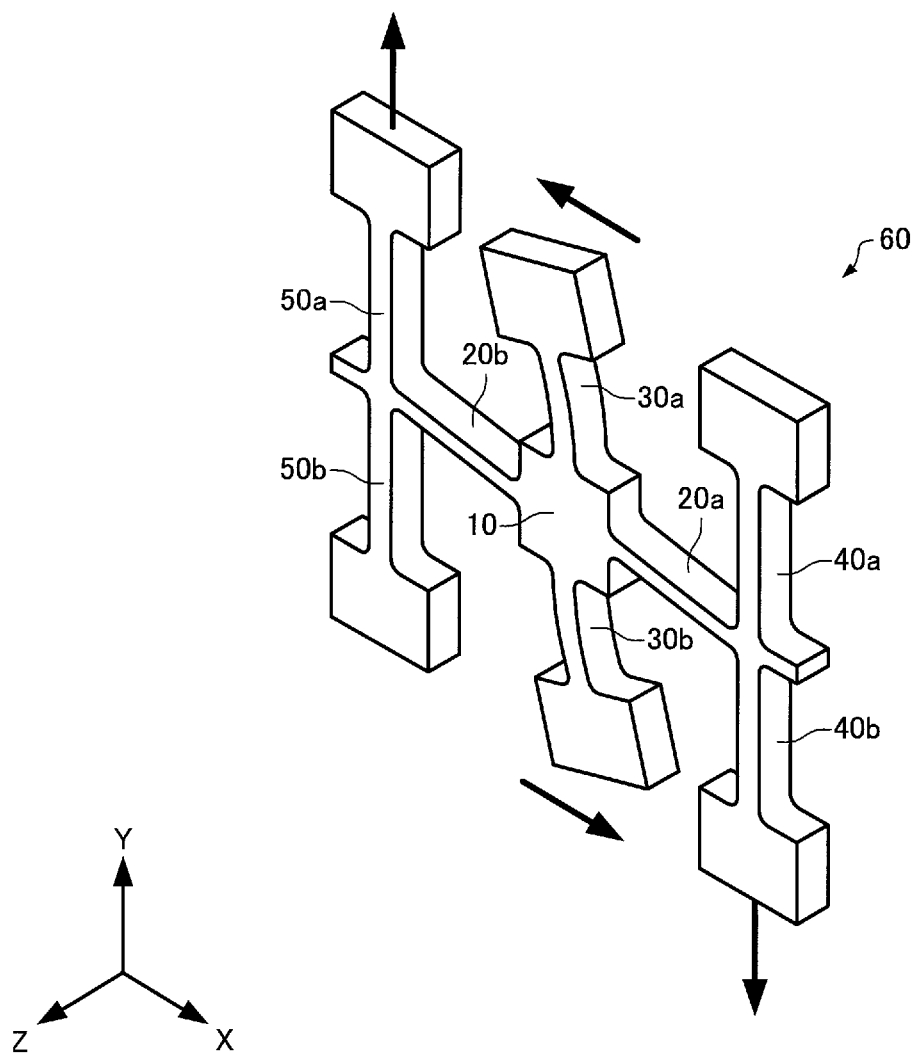
FIG. 6 is a diagram illustrating the operation of the piezoelectric vibrating reed of the physical amount detecting device according to the embodiment.

In contrast to the above-described example, in a case where a negative voltage is applied to the driving signal electrode 110 with respect to the driving ground electrode 120, as shown in FIG. 6, the driving vibration arm 30a bends in the negative X-axis direction with the base portion 10 used as a support portion, and the driving vibration arm 30b bends in the positive X-axis direction with the base portion 10 used as a support portion.

As above, in accordance with change in the polarity of the AC voltage applied to the driving signal electrode 110, the driving vibration arms 30a and 30b are in bending vibration in the X-axis direction with the opposite phases. In accordance with the bending vibration of the driving vibration arms 30a and 30b, the connection arms 20a and 20b, as shown in FIGS. 5 and 6, are in bending vibration in the Y-axis direction with opposite phases with the base portion 10 used as a support portion. As a result, the first detection vibration arms 40a and 40b and the second detection vibration arms 50a and 50b vibrate in the Y-axis direction with opposite phases.

Here, when the angular velocity using the X axis as its rotation axis is applied to the piezoelectric vibrating reed 60, the first detection vibration arms 40a and 40b and the second detection vibration arms 50a and 50b obtain a Coriolis force in a direction perpendicular to both the Y axis, which is the direction of the vibration, and the X axis, which is the rotation axis, that is, the Z-axis direction. As a result, the first detection vibration arms 40a and 40b, in addition to the above-described vibration in the Y-axis direction, are in bending vibration in the Z-axis direction with the first phase with the connection arm 20a used as a support portion, and the second detection vibration arms 50a and 50b, in addition to the above-described vibration in the Y-axis direction, are in bending vibration in the Z-axis direction with the second phase, which is opposite to the first phase, with the connection arm 20b used as a support portion.

Figure 7:
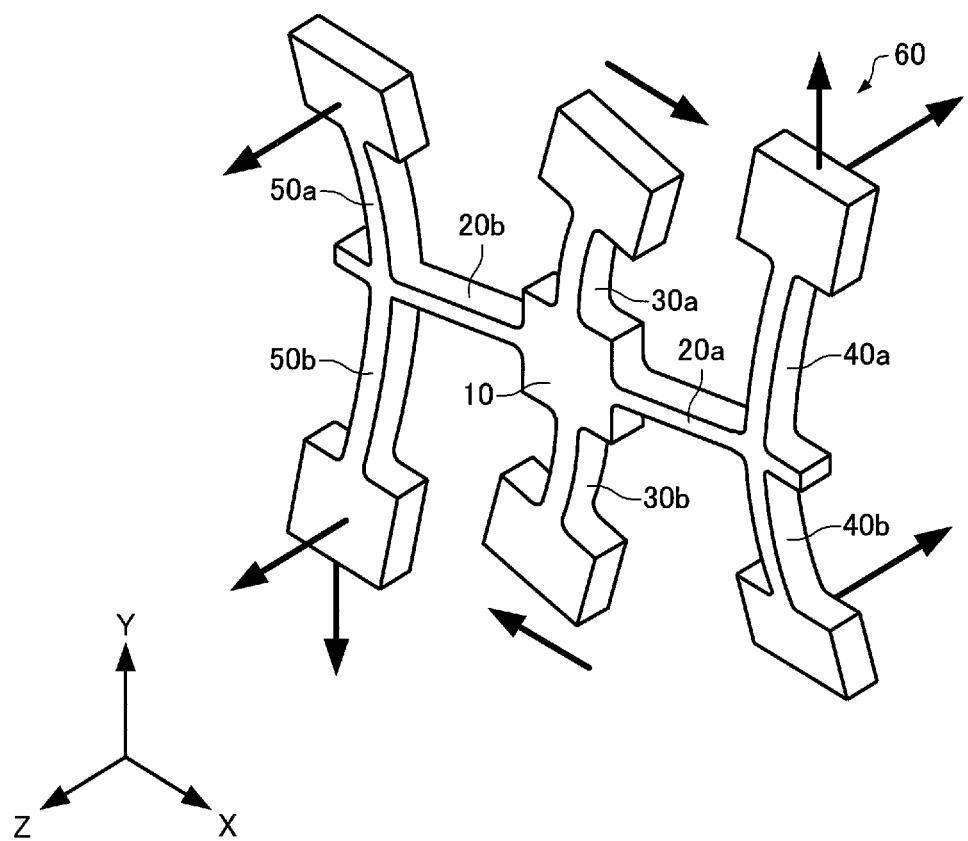
FIG. 7 is a diagram illustrating the operation of the piezoelectric vibrating reed of the physical amount detecting device according to the embodiment.
Figure 8:
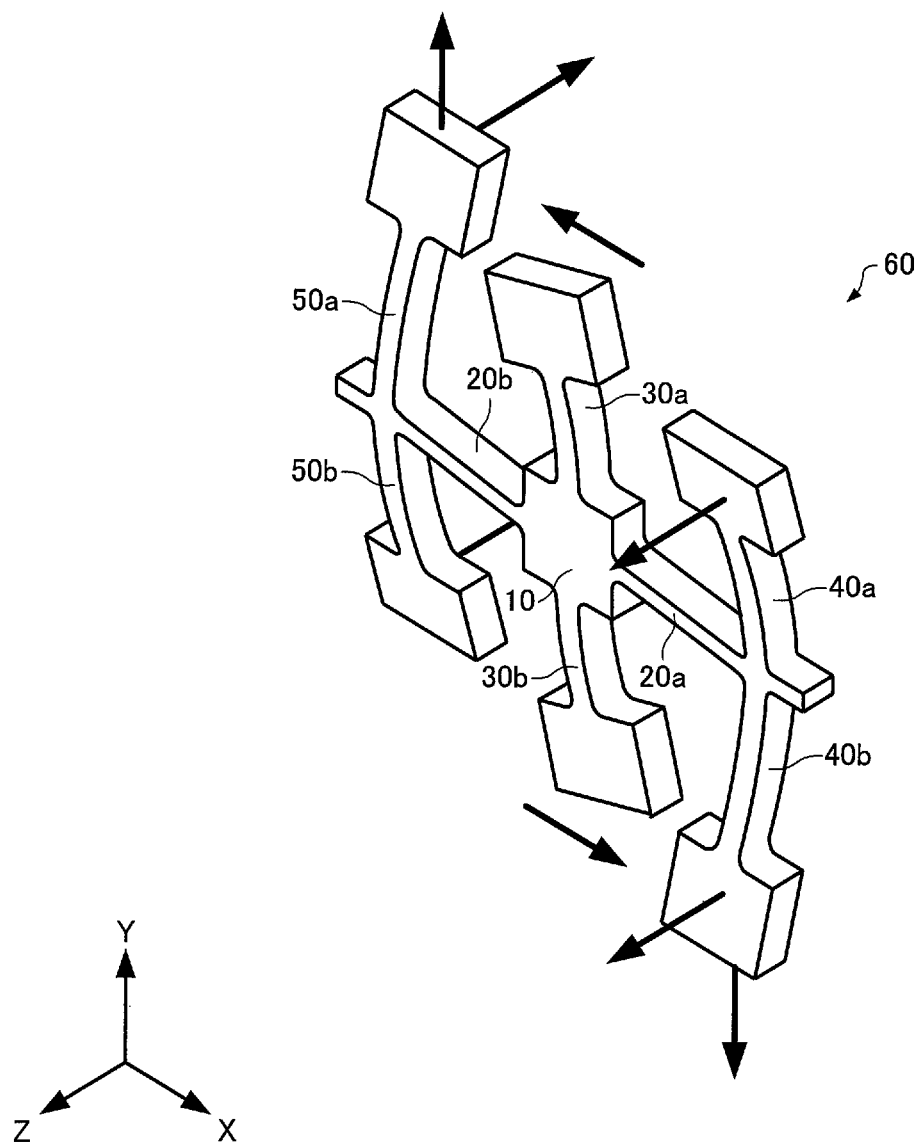
FIG. 8 is a diagram illustrating the operation of the piezoelectric vibrating reed of the physical amount detecting device according to the embodiment.

More specifically, as shown in FIG. 7, the first detection vibration arms 40a and 40b are displaced in the positive Y-axis direction (the direction of an arrow on the Y-axis) and displaced in the negative Z-axis direction (the direction opposite to the direction of the arrow on the Z axis) at a certain moment. Simultaneously, the second detection vibration arms 50a and 50b are displaced in the negative Y-axis direction (the direction opposite to the direction of an arrow on the Y axis) and displaced in the positive Z-axis direction (the direction of an arrow of the Z axis) at a certain moment. In addition, as shown in FIG. 8, the first detection vibration arms 40a and 40b are displaced in the negative Y-axis direction (the direction opposite to the direction of the arrow on the Y-axis) and displaced in the positive Z-axis direction (the direction of the arrow on the Z axis) at a certain moment. Simultaneously, the second detection vibration arms 50a and 50b are displaced in the positive Y-axis direction (the direction of the arrow on the Y axis) and displaced in the negative Z-axis direction (the direction opposite to the direction of the arrow of the Z axis) at a certain moment.

According to the bending vibration of the first detection vibration arms 40a and 40b and the second detection vibration arms 50a and 50b, electric charge is generated in the first detection signal electrode 130 and the second detection signal electrode 150. The electric charge changes in accordance with the magnitude (that is, the magnitude of the angular velocity applied to the piezoelectric vibrating reed 60) of the Coriolis force. Accordingly, by acquiring the electric charge as a detection signal, the rotational angular velocity of the X-axis rotation can be detected.

In addition, the physical amount detecting device 100 can detect not only the rotational angular velocity of the X-axis rotation but also the rotational angular acceleration of the X-axis rotation.

2. Modified Example of Physical Amount Detecting Device

Figure 9:
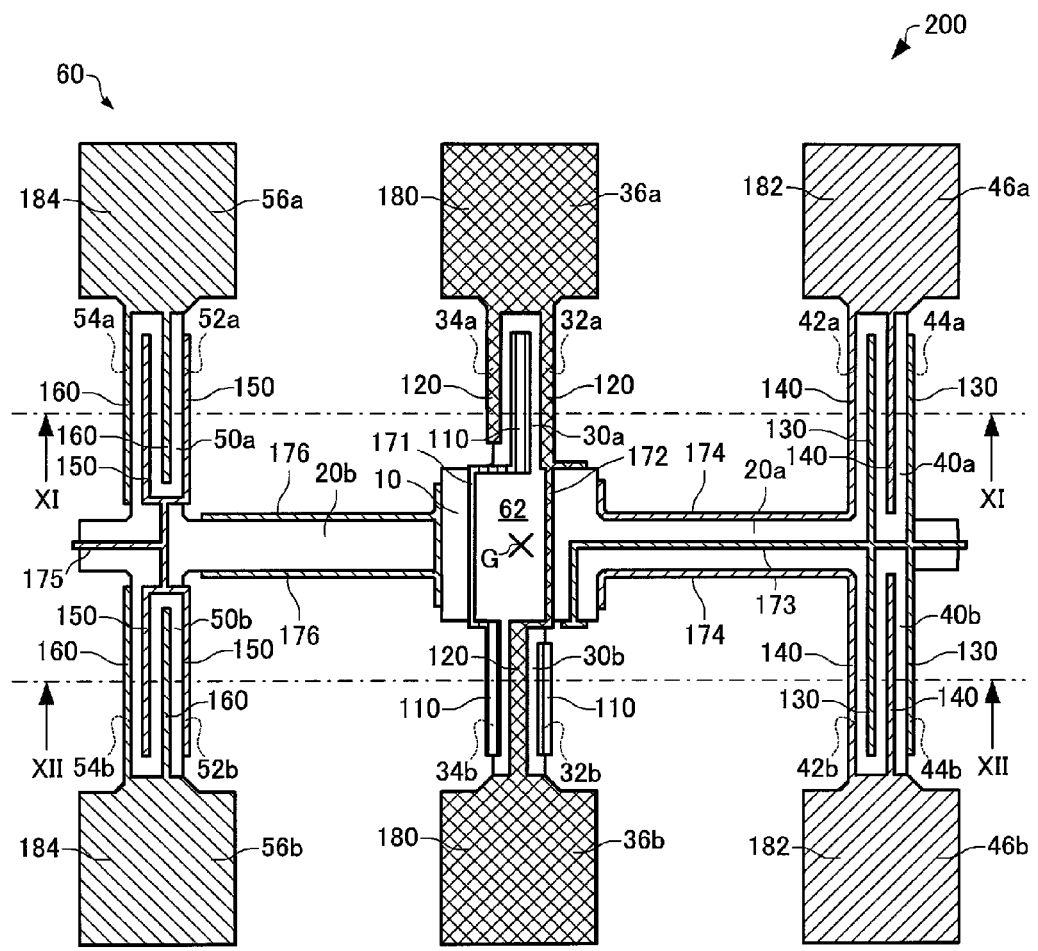
FIG. 9 is a schematic diagram illustrating the configuration of the first primary face side of a physical amount detecting device according to a modified example of an embodiment of the invention.
Figure 9:
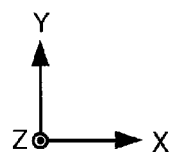
Figure 10:
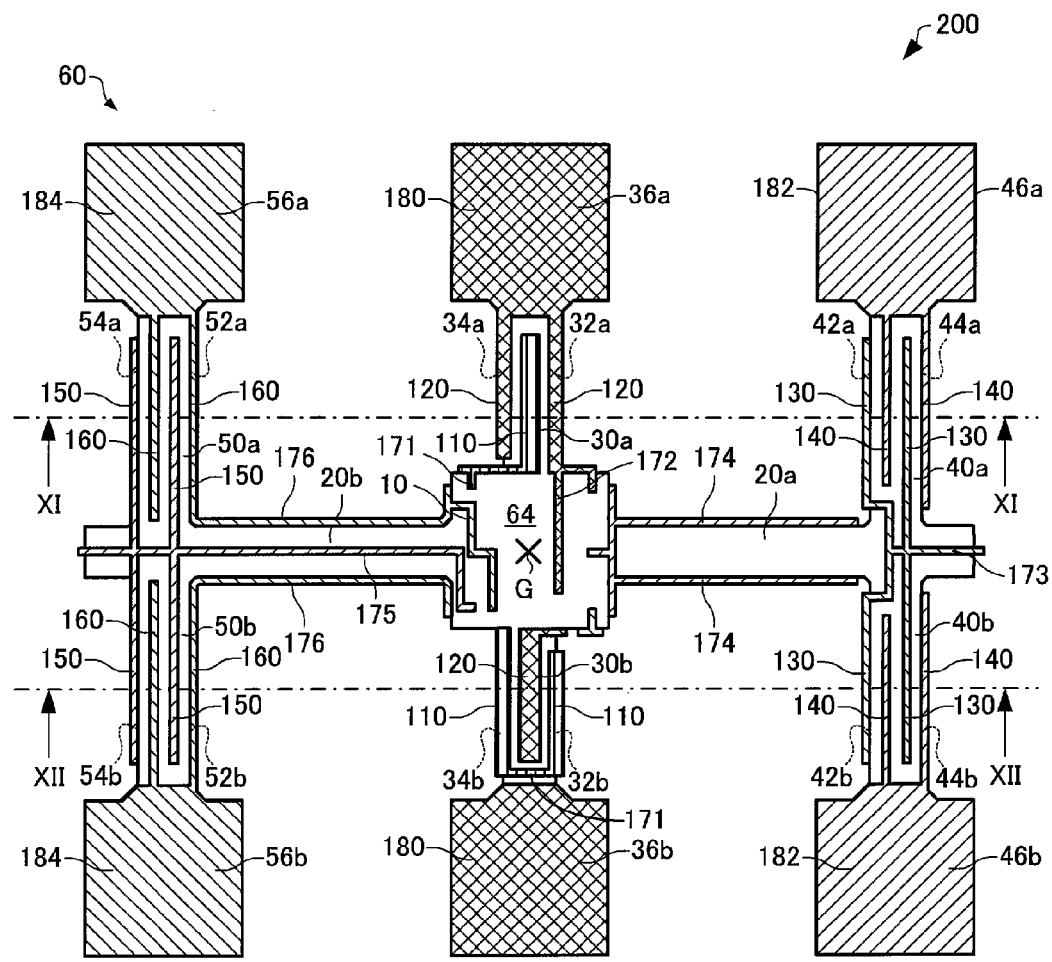
FIG. 10 is a schematic diagram illustrating the configuration of the second primary face side of a physical amount detecting device according to a modified example of an embodiment of the invention.
Figure 11:
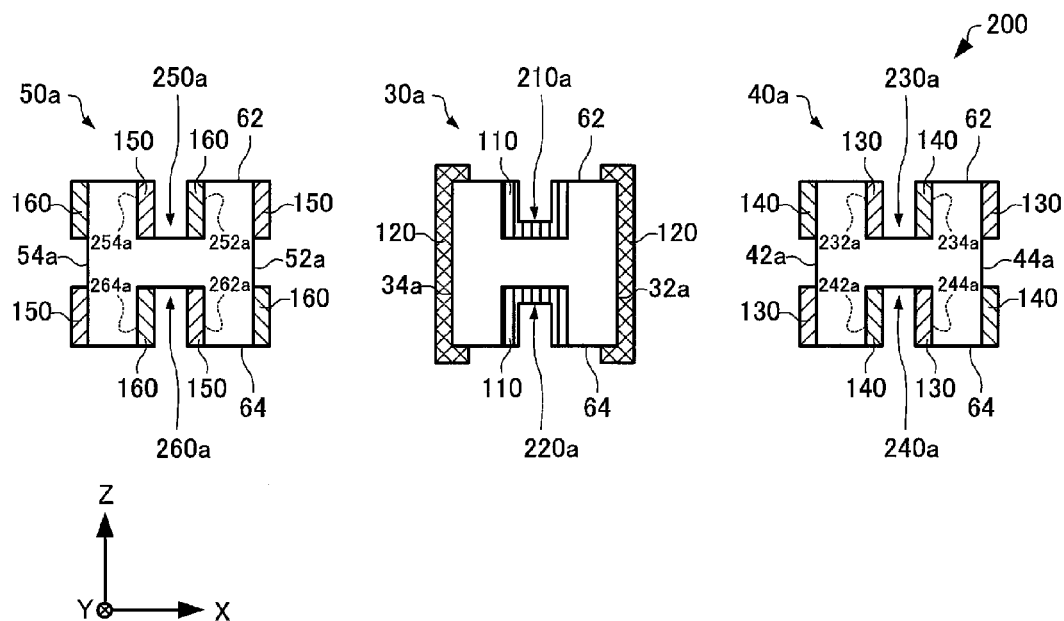
FIG. 11 is a cross-sectional view schematically showing a physical amount detecting device according to a modified example of an embodiment of the invention.
Figure 12:
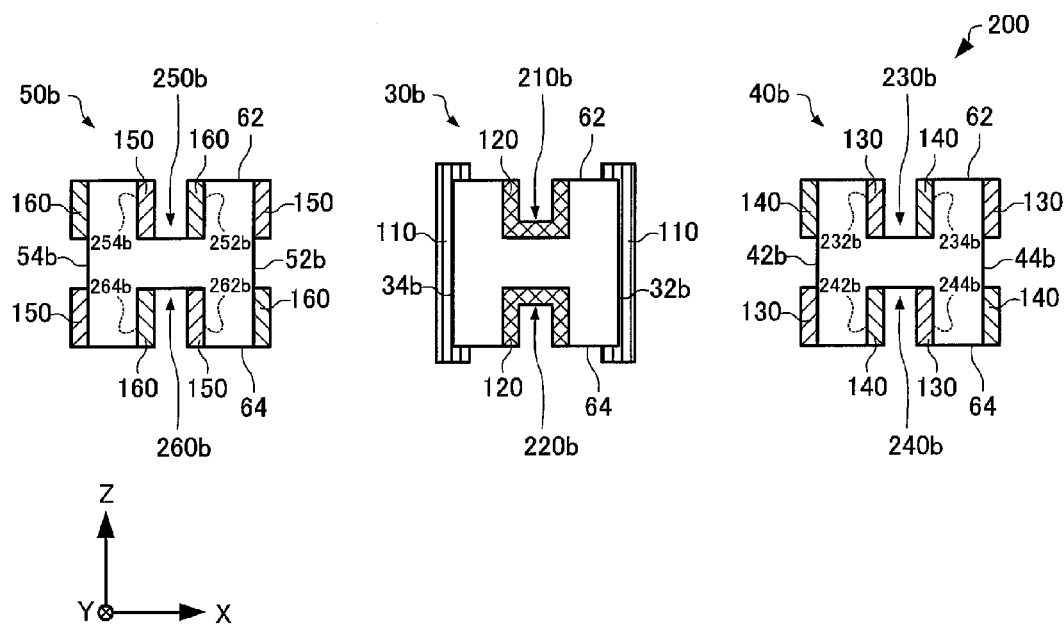
FIG. 12 is a cross-sectional view schematically showing a physical amount detecting device according to a modified example of an embodiment of the invention.

Next, a physical amount detecting device 200 according to a modified example of this embodiment will be described. FIG. 9 is a plan view of the physical amount detecting device 200 viewed from the side of the first primary face 62 that is one primary face thereof and is a diagram illustrating the configuration of the first primary face 62 side. FIG. 10 is a perspective view of the physical amount detecting device 100 viewed from the first primary face 62 side thereof and is a diagram illustrating the configuration of the side of the second primary face 64 side that is the other primary face. FIG. 11 is a cross-sectional view taken along line XI-XI shown in FIGS. 9 and 10, schematically showing the physical amount detecting device 200. FIG. 12 is a cross-sectional view taken along line XII-XII shown in FIGS. 9 and 10, schematically showing the physical amount detecting device 200. In FIGS. 9 and 10, for convenience of the description, grooves 210a, 210b, 220a, 220b, 230a, 230b, 240a, 240b, 250a, 250b, 260a, and 260b are not shown.

Hereinafter, the same reference numeral is assigned to each member of the physical amount detecting device 200 according to a modified example of this embodiment which has the same function as a constituent member of the physical amount detecting device 100, and a detailed description thereof is omitted.

2.1 Piezoelectric Vibrating Reed

In a piezoelectric vibrating reed 60 of the physical amount detecting device 200, as shown in FIGS. 11 and 12, grooves 210a, 210b, 220a, 220b, 230a, 230b, 240a, 240b, 250a, 250b, 260a, and 260b are formed. More specifically, the first grooves 210a and 210b are respectively formed on the first primary face 62 of the driving vibration arms 30a and 30b. The second grooves 220a and 220b are respectively formed on the second primary face 64 of the driving vibration arms 30a and 30b. The third grooves 230a and 230b are respectively formed on the first primary face 62 of the first detection vibration arms 40a and 40b. The fourth grooves 240a and 240b are respectively formed on the second primary face 64 of the first detection vibration arms 40a and 40b. The fifth grooves 250a and 250b are respectively formed on the first primary face 62 of the second detection vibration arms 50a and 50b. The sixth grooves 260a and 260b are respectively formed on the second primary face 64 of the second detection vibration arms 50a and 50b.

The cross-sectional shape of the grooves 210a, 210b, 220a, 220b, 230a, 230b, 240a, 240b, 250a, 250b, 260a, and 260b is not particularly limited and has two inner faces formed along the YZ plane and an inner face, which connects the two inner faces, formed along the XY plane in the example shown in the figure. The planar shape of the grooves 210a, 210b, 220a, 220b, 230a, 230b, 240a, 240b, 250a, 250b, 260a, and 260b, although not shown in the figure, for example, is an approximate rectangle in which the length along the Y-axis direction is longer than that along the X-axis direction.

2.2 Electrodes (1) Driving Signal Electrode 110 and Driving Ground Electrode 120

A driving signal electrode 110, as shown in FIGS. 9 to 12, is formed on the inner faces of the first groove 210a and the second groove 220a of a driving vibration arm 30a and the first side face 32b and the second side face 34b of a driving vibration arm 30b. In the example shown in the figure, the driving signal electrode 110 is formed so as to cover the inner faces of the first groove 210a and the second groove 220a.

A driving ground electrode 120 is formed on the first side face 32a and the second side face 34a of the driving vibration arm 30a and the first groove 210b and the second groove 220b of the driving vibration arm 30b. In the example shown in the figure, the driving signal electrode 110 is formed so as to cover the inner faces of the first groove 210b and the second groove 220b.

The driving signal electrode 110 and the driving ground electrode 120, for example, have portions facing each other through the driving vibration arm 30a or the driving vibration arm 30b. Accordingly, a voltage can be efficiently applied between the driving signal electrode 110 and the driving ground electrode 120.

(2) First Detection Signal Electrode 130 and First Detection Ground Electrode 140

A first detection signal electrode 130 is formed on the first primary face 62 side of the fourth side faces 44a and 44b, the second primary face 64 side of the third side faces 42a and 42b, the inner faces 232a and 232b of the third grooves 230a and 230b that are located on the side of the third side faces 42a and 42b, and the inner faces 244a and 244b of the fourth grooves 240a and 240b that are located on the side of the fourth side faces 44a and 44b.

A first detection ground electrode 140 is formed on the first primary face 62 side of the third side faces 42a and 42b, the second primary face 64 side of the fourth side faces 44a and 44b, the inner faces 234a and 234b of the third grooves 230a and 230b that are located on the side of the fourth side faces 44a and 44b, and the inner faces 242a and 242b of the fourth grooves 240a and 240b that are located on the side of the third side faces 42a and 42b.

The first detection signal electrode 130 formed on the fourth side faces 44a and 44b and the first detection ground electrode 140 formed on the inner faces 234a and 234b, for example, face each other through the first detection vibration arm 40a or the first detection vibration arm 40b. The first detection signal electrode 130 formed on the inner faces 232a and 232b and the first detection ground electrode 140 formed on the third side faces 42a and 42b, for example, face each other through the first detection vibration arm 40a or the first detection vibration arm 40b. The first detection signal electrode 130 formed on the third side faces 42a and 42b and the first detection ground electrode 140 formed on the inner faces 242a and 242b, for example, face each other through the first detection vibration arm 40a or the first detection vibration arm 40b. The first detection signal electrode 130 formed on the inner faces 244a and 244b and the first detection ground electrode 140 formed on the fourth side faces 44a and 44b, for example, face each other through the first detection vibration arm 40a or the first detection vibration arm 40b. Accordingly, electric charge generated between the first detection signal electrode 130 and the first detection ground electrode 140 can be efficiently obtained as a detection signal.

(3) Second Detection Signal Electrode 150 and Second Detection Ground Electrode 160

A second detection signal electrode 150 is formed on the first primary face 62 side of the fifth side faces 52a and 52b, the second primary face 64 side of the sixth side faces 54a and 54b, the inner faces 254a and 254b of the fifth grooves 250a and 250b that are located on the side of the sixth side faces 54a and 54b, and the inner faces 262a and 262b of the sixth grooves 260a and 260b that are located on the side of the fifth side faces 52a and 52b.

A second detection ground electrode 160 is formed on the first primary face 62 side of the sixth side faces 54a and 54b, the second primary face 64 side of the fifth side faces 52a and 52b, the inner faces 252a and 252b of the fifth grooves 250a and 250b that are located on the side of the fifth side faces 52a and 52b, and the inner faces 264a and 264b of the sixth grooves 260a and 260b that are located on the side of the sixth side faces 54a and 54b.

The second detection signal electrode 150 formed on the fifth side faces 52a and 52b and the second detection ground electrode 160 formed on the inner faces 252a and 252b, for example, face each other through the second detection vibration arm 50a or the second detection vibration arm 50b. The second detection signal electrode 150 formed on the inner faces 254a and 254b and the second detection ground electrode 160 formed on the sixth side faces 54a and 54b, for example, face each other through the second detection vibration arm 50a or the second detection vibration arm 50b. The second detection signal electrode 150 formed on the sixth side faces 54a and 54b and the second detection ground electrode 160 formed on the inner faces 264a and 264b, for example, face each other through the second detection vibration arm 50a or the second detection vibration arm 50b. The second detection signal electrode 150 formed on the inner faces 262a and 262b and the second detection ground electrode 160 formed on the fifth side faces 52a and 52b, for example, face each other through the second detection vibration arm 50a or the second detection vibration arm 50b. Accordingly, electric charge generated between the second detection signal electrode 150 and the second detection ground electrode 160 can be efficiently obtained as a detection signal.

2.3 Operation of Piezoelectric Vibrating Reed

The operation of the piezoelectric vibrating reed 60 of the physical amount detecting device 200 is equal to that of the piezoelectric vibrating reed 60 of the physical amount detecting device 100. Thus, the description thereof is omitted.

In the physical amount detecting device 200 according to a modified example of this embodiment, as described above, electrodes can be formed on the inner faces of the grooves 210a, 210b, 220a, 220b, 230a, 230b, 240a, 240b, 250a, 250b, 260a, and 260b. Accordingly, the CI (crystal impedance) value of the physical amount detecting device 200, for example, can be smaller than that of the physical amount detecting device 100.

3. Physical Amount Detecting Apparatus

Figure 13:
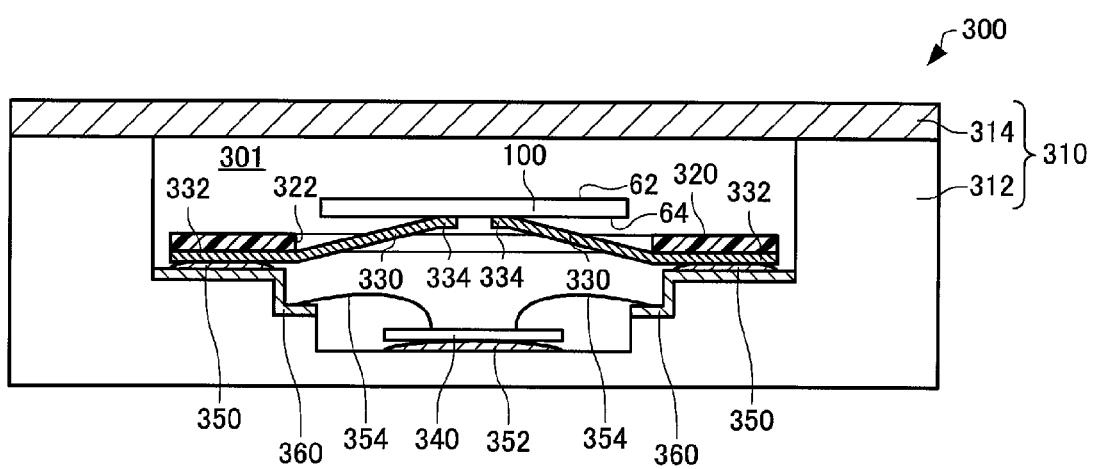
FIG. 13 is a cross-sectional view schematically showing a physical amount detecting apparatus according to an embodiment of the invention.
Figure 14:
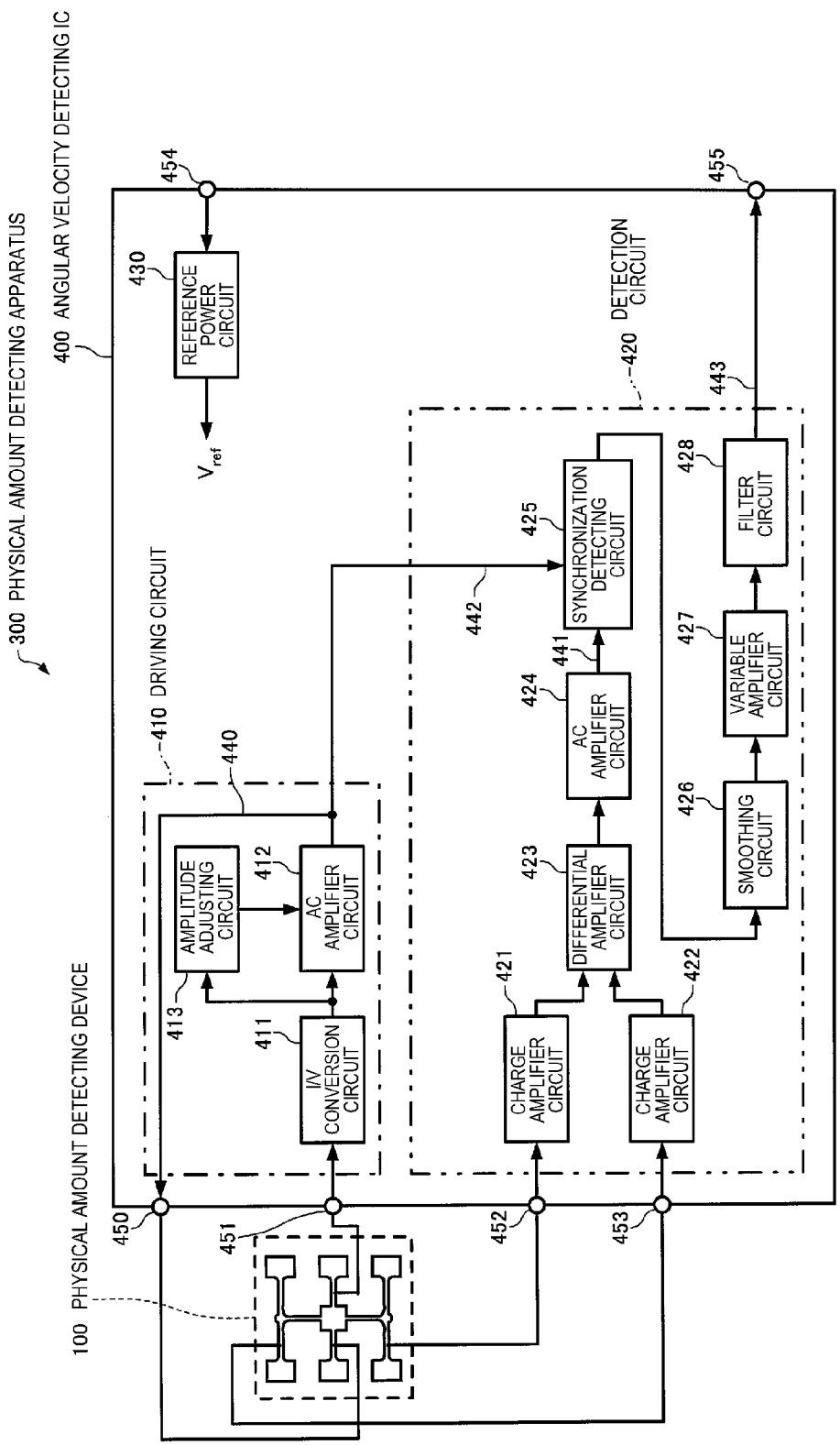
FIG. 14 is a diagram illustrating the configuration of the physical amount detecting apparatus according to the embodiment.

Next, a physical amount detecting apparatus 300 according to this embodiment will be described with reference to drawings. FIG. 13 is a cross-sectional view schematically showing the physical amount detecting apparatus 300. FIG. 14 is a diagram illustrating the configuration of the physical amount detecting apparatus 300. In FIGS. 13 and 14, the physical amount detecting device 100 is shown in a simplified manner.

The physical amount detecting apparatus 300 may include: a package 310 having a physical amount detecting device (for example, the physical amount detecting device 100) according to an embodiment of the invention, a package base 312, and a lead 314; a support substrate 320; a lead 330; and an IC chip 340.

The package base 312 may have an opening and can house the physical amount detecting device 100 inside the opening. As examples of the material of the package base 312, there are ceramic, glass, and the like.

The lead 314 is disposed on the package base 312 and seals the opening of the package base 312. As examples of the material of the lead 314, there are metal such as 42 alloy (alloy of iron containing 42% nickel) or kovar (alloy of iron, nickel, and cobalt), ceramic, and glass. A cavity 301 that is formed by the package base 312 and the lead 314 becomes a space that is used for the operation of the physical amount detecting device 100. The cavity 301 can be sealed and can be formed in a decompressed space or in inactive gas atmosphere.

The support substrate 320 is housed inside the cavity 301 of the package 310. As the material of the support substrate 320, for example, a resin such as polyimide can be used. The support substrate 320 is fixed to the cavity 301 through the lead 330. The support substrate 320 may have a through hole 322 that is formed through from the upper face of the support substrate 320 to the lower face thereof.

The lead 330 is housed inside the cavity 301 of the package 310. As examples of the material of the lead 330, there are copper, gold, nickel, and an alloy thereof. In the example shown in the figure, the lead 330 extends from the lower face side of the end portion of the support substrate 320 to the side of the upper face of the support substrate 320 through the through hole 322. The upper face of one end portion 332 of the lead 330, for example, is bonded to the lower face of the support substrate 320 using an adhesive agent. The lower face of the one end portion 332, for example, is bonded to the connection wiring 360, which is formed on the inner face of the package 310, with a soldering material 350. The upper face of the other end portion 334 of the lead 330 is bonded to the physical amount detecting device 100, for example, by thermal compression. Although not shown in the figure, a plurality of the leads 330 may be disposed in correspondence with the wirings 171 to 176 of the physical amount detecting device 100 and be connected to the wirings 171 to 176 formed on the second primary face 64 of the base portion 10.

The physical amount detecting device 100 is supported at the upper side of the support substrate 320 by the lead 330. In the example shown in the figure, the physical amount detecting device 100 is supported such that the first primary face 62 faces the lower face of the lead 314, and the second primary face 64 faces the inner face (inner lower face) of the package base 312.

The IC chip 340, for example, is housed inside the cavity 301 of the package 310. The IC chip 340 is fixed to the package base 312, for example, by a soldering material 352. The IC chip 340 is a chip that is used for controlling the physical amount detecting device 100. The IC chip 340 is electrically connected to the connection wiring 360 that is formed in the package base 312, for example, through a wire 354. Accordingly, the wirings 171 to 176 of the physical amount detecting device 100 are electrically connected to the IC chip 340. Although not shown in the figure, the IC chip 340 may be disposed outside the cavity 301. In the IC chip 340, an angular velocity detecting IC 400 is built.

The angular velocity detecting IC 400, as shown in FIG. 10, may include a driving circuit 410, a detection circuit 420, and a reference power circuit 430.

The driving circuit 410 may include an I/V conversion circuit (current-to-voltage converting circuit) 411, an AC amplifier circuit 412, and an amplitude adjusting circuit 413.

A driving current flowing through the piezoelectric vibrating reed of the physical amount detecting device 100 is converted into an AC voltage signal by the I/V conversion circuit 411.

The AC voltage signal output from the I/V conversion circuit 411 is input to the AC amplifier circuit 412 and the amplitude adjusting circuit 413. The AC amplifier circuit 412 amplifies the input AC voltage signal, clips the amplified AC voltage signal at a predetermined voltage value, and outputs a rectangular wave voltage signal 440. The amplitude adjusting circuit 413 controls the AC amplifier circuit 412 so as to maintain the driving current to be constant by changing the amplitude of the rectangular wave voltage signal 440 in accordance with the level of the AC voltage signal output by the I/V conversion circuit 411.

The rectangular wave voltage signal 440 is supplied to the driving signal electrode 110 of the physical amount detecting device 100 through an external output terminal 450. As above, the physical amount detecting device 100, for example, continuously excites predetermined driving vibration as shown in FIGS. 5 and 6. In addition, by maintaining the driving current to be constant, the driving vibration arms 30a and 30b of the physical amount detecting device 100 can acquire constant vibration speed. Accordingly, the vibration speed that becomes the source for generating a Coriolis force is constant, and therefore the sensitivity can be further stabilized.

Here, the driving circuit 410 serves as a driving unit according to an embodiment of the invention.

The detection circuit 420 may include: charge amplifier circuits 421 and 422; a differential amplifier circuit 423; an AC amplifier circuit 424; a synchronization detecting circuit 425; a smoothing circuit 426; a variable amplifier circuit 427; and a filter circuit 428.

An AC electric charge, which is a detection signal transmitted from the first detection signal electrode 130 of the physical amount detecting device 100, is input to the charge amplifier circuit 421 through an external input terminal 452.

Similarly, an AC electric charge, which is a detection signal transmitted from the second detection signal electrode 150 of the physical amount detecting device 100, is input to the charge amplifier circuit 422 through an external input terminal 453.

These charge amplifier circuits 421 and 422 convert the respective input AC electric charge into AC voltage signals with a reference voltage $V_{ref}$ used as a reference. Here, the reference voltage $V_{ref}$ is generated based on an external power source input from the power input terminal 454 by the reference power circuit 430.

The differential amplifier circuit 423 performs differential amplification for the output signal of the charge amplifier circuit 421 and the output signal of the charge amplifier circuit 422. The differential amplifier circuit 423 is used for eliminating the same-phase component and adding and amplifying opposite-phase components.

The AC amplifier circuit 424 amplifies the output signal of the differential amplifier circuit 423 and inputs the amplified output signal to the synchronization detecting circuit 425 as a signal 441 to be detected.

The synchronization detecting circuit 425 performs synchronization detection for the signal 441 to be detected by using a detection signal 442.

The output signal of the synchronization detecting circuit 425 is smoothed into a DC voltage signal by the smoothing circuit 426 and is input to the variable amplifier circuit 427.

The variable amplifier circuit 427 adjusts the detection sensitivity by amplifying (or attenuating) the output signal (the DC voltage signal) of the smoothing circuit 426 at an amplification rate (or an attenuation rate) that is set. The signal amplified (or attenuated) by the variable amplifier circuit 427 is input to the filter circuit 428.

The filter circuit 428 is a circuit that limits the output signal of the variable amplifier circuit 427 to a frequency band that is appropriate for the use and generates an angular velocity detection signal 443. Then, the angular velocity detection signal 443 is externally output through an external output terminal 455.

As above, the physical amount detecting apparatus 300 can detect the angular velocity. The voltage value of the angular velocity detection signal 443 is in proportion to the magnitude of the Coriolis force (the magnitude of the angular velocity), and the polarity of the angular velocity detection signal 443 is determined based on the rotation direction. Accordingly, the angular velocity applied to the physical amount detecting apparatus 300 can be calculated based on the angular velocity detection signal 443.

4. Electronic Apparatus

A physical amount detecting device according to an embodiment of the invention or a physical amount detecting apparatus according to an embodiment of the invention can be appropriately used in electronic apparatuses such as a digital still camera, a video camera, a navigation system, a pointing device, a game controller, and a cellular phone. Thus, in any of the case, an electronic apparatus having the advantages described in the above-described embodiments can be provided.

In addition, the embodiments and the modified examples described above are merely examples, and the invention is not limited thereto. For example, each embodiment and each modified example can be appropriately combined.

As described above, although the embodiments of the invention have been described in detail, it can be easily understood by those in the art that various changes can be made therein without substantially departing from a new matter and advantages of the invention. Therefore, such modified examples belong to the scope of the invention.

The entire disclosure of Japanese Patent Application No. 2010-072459, filed on Mar. 26, 2010 and Japanese Patent Application No. 2010-237414, filed on Oct. 22, 2010 are expressly incorporated by reference herein.

What is claimed is:

1. A physical amount detecting device comprising:

a base portion;

one pair of connection arms that extend from the base portion in opposite directions along an X axis;

one pair of driving vibration arms that extend from the base portion in opposite directions along a Y axis;

one pair of first detection vibration arms that extend from one of the one pair of connection arms in opposite directions along the Y axis;

one pair of second detection vibration arms that extend from the other of the one pair of connection arms in opposite directions along the Y axis;

a driving signal electrode that is used for bending vibration of the one pair of driving vibration arms;

a driving ground electrode that forms a pair with the driving signal electrode;

a first detection signal electrode that is used for obtaining a detection signal from the one pair of the first detection vibration arms;

a first detection ground electrode that forms a pair with the first detection signal electrode;

a second detection signal electrode that is used for obtaining a detection signal from the one pair of the second detection vibration arms; and a second detection ground electrode that forms a pair with the second detection signal electrode, wherein one and the other of the one pair of the driving vibration arms are configured to be bending-vibrated with opposite phases in a direction of the X-axis, the one pair of the first detection vibration arms and the one pair of the second detection vibration arms are configured to be vibrated with opposite phases in a direction of the Y axis in accordance with the bending vibration of the one pair of driving vibration arms, depending on a Coriolis force that is generated in accordance with rotational angular velocity of X-axis rotation, one and the other of the one pair of the first detection vibration arms are configured to be bending-vibrated with a first phase in a direction of a Z axis in addition to vibration in the direction of the Y axis, and one and the other of the one pair of the second detection vibration arms are configured to be bending-vibrated with a second phase, which is a phase opposite to the first phase, in the direction of the Z axis in addition to vibration in the direction of the Y axis, the base portion, the one pair of connection arms, the one pair of driving vibration arms, the one pair of the first detection vibration arms, and the one pair of the second detection vibration arms configure a piezoelectric vibrating reed, the piezoelectric vibrating reed has a first primary face and a second primary face that are front and rear faces along a plane defined by the X axis and the Y axis, the one pair of driving vibration arms has a first side face that connects the first primary face and the second primary face and a second side face that connects the first primary face and the second primary face and is located on a side opposite to the first side face, the one pair of the first detection vibration arms has a third side face that connects the first primary face and the second primary face and faces the first side face and a fourth side face that connects the first primary face and the second primary face and is located on a side opposite to the third side face, the one pair of the second detection vibration arms has a fifth side face that connects the first primary face and the second primary face and faces the second side face and a sixth side face that connects the first primary face and the second primary face and is located on a side opposite to the fifth side face, the driving signal electrode is formed on the first and second primary faces of one of the one pair of the driving vibration arms and the first and second side faces of the other of the one pair of driving vibration arms, the driving ground electrode is formed on the first and second side faces of one of the one pair of driving vibration arms and the first and second primary faces of the other of the one pair of driving vibration arms, the first detection signal electrode is formed on the first primary face side of the fourth side face and the second primary face side of the third side face, the first detection ground electrode is formed on the first primary face side of the third side face and the second primary face side of the fourth side face, the second detection signal electrode is formed on the first primary face side of the fifth side face and the second primary face side of the sixth side face, and the second detection ground electrode is formed on the first primary face side of the sixth side face and the second primary face side of the fifth side face.

2. The physical amount detecting device according to claim 1, wherein the first detection signal electrode and the first detection ground electrode face each other through a first detection driving arm, and wherein the second detection signal electrode and the second detection ground electrode face each other through a second detection driving arm.

3. A physical amount detecting apparatus comprising:
the physical amount detecting device according to claim 1;
a package in which the physical amount detecting device is housed; and
an IC chip that is used for controlling the physical amount detecting device.

4. A physical amount detecting device comprising:
a base portion;
one pair of connection arms that extend from the base portion in opposite directions along an X axis;
one pair of driving vibration arms that extend from the base portion in opposite directions along a Y axis;
one pair of first detection vibration arms that extend from one of the one pair of connection arms in opposite directions along the Y axis;
one pair of second detection vibration arms that extend from the other of the one pair of connection arms in opposite directions along the Y axis;

a driving signal electrode that is used for bending vibration of the one pair of driving vibration arms;

a driving ground electrode that forms a pair with the driving signal electrode;

a first detection signal electrode that is used for obtaining a detection signal from the one pair of the first detection vibration arms;

a first detection ground electrode that forms a pair with the first detection signal electrode;

a second detection signal electrode that is used for obtaining a detection signal from the one pair of the second detection vibration arms; and a second detection ground electrode that forms a pair with the second detection signal electrode, wherein one and the other of the one pair of the driving vibration arms are configured to be bending-vibrated with opposite phases in a direction of the X-axis, the one pair of the first detection vibration arms and the one pair of the second detection vibration arms are configured to be vibrated with opposite phases in a direction of the Y axis in accordance with the bending vibration of the one pair of driving vibration arms, depending on a Coriolis force that is generated in accordance with rotational angular velocity of X-axis rotation, one and the other of the one pair of the first detection vibration arms are configured to be bending-vibrated with a first phase in a direction of a Z axis in addition to vibration in the direction of the Y axis, and one and the other of the one pair of the second detection vibration arms are configured to be bending-vibrated with a second phase, which is a phase opposite to the first phase, in the direction of the Z axis in addition to vibration in the direction of the Y axis, the base portion, the one pair of connection arms, the one pair of driving vibration arms, the one pair of the first detection vibration arms, and the one pair of the second detection vibration arms configure a piezoelectric vibrating reed, the piezoelectric vibrating reed has a first primary face and a second primary face that are front and rear faces along a plane defined by the X axis and the Y axis, the one pair of driving vibration arms has a first side face that connects the first primary face and the second primary face and a second side face that connects the first primary face and the second primary face and is located on a side opposite to the first side face, the one pair of the first detection vibration arms has a third side face that connects the first primary face and the second primary face and faces the first side face and a fourth side face that connects the first primary face and the second primary face and is located on a side opposite to the third side face, the one pair of the second detection vibration arms has a fifth side face that connects the first primary face and the second primary face and faces the second side face and a sixth side face that connects the first primary face and the second primary face and is located on a side opposite to the fifth side face, a first groove is formed on the first primary face of the one pair of driving vibration arms, a second groove is formed on the second primary face of the one pair of driving vibration arms, a third groove is formed on the first primary face of the one pair of the first detection vibration arms, a fourth groove is formed on the second primary face of the one pair of the first detection vibration arms, a fifth groove is formed one the first primary face of the one pair of the second detection vibration arms, a sixth groove is formed on the second primary face of the one pair of the second detection vibration arms, the driving signal electrode is formed on inner faces of the first and second grooves of one of the one pair of driving vibration arms and the first and second side faces of the other of the one pair of driving vibration arms, the driving ground electrode is formed on the first and second side faces of one of the one pair of driving vibration arms and the inner faces of the first and second grooves of the other of the one pair of driving vibration arms, the first detection signal electrode is formed on the first primary face side of the fourth side face, the second primary face side of the third side face, an inner face of the third groove that is located on the third side face side, and an inner face of the fourth groove that is located on the fourth side face side, the first detection ground electrode is formed on the first primary face side of the third side face, the second primary face side of the fourth side face, the inner face of the third groove that is located on the fourth side face side, and the inner face of the fourth groove that is located on the third side face side, the second detection signal electrode is formed on the first primary face side of the fifth side face, the second primary face side of the sixth side face, an inner face of the fifth groove that is located on the sixth side face side, and an inner face of the sixth groove that is located on the fifth side face side, and the second detection ground electrode is formed on the first primary face side of the sixth side face, the second primary face side of the fifth side face, the inner face of the fifth groove that is located on the fifth side face side, and the inner face of the sixth groove that is located on the sixth side face side.

5. The physical amount detecting device according to claim 4, wherein the first detection signal electrode and the first detection ground electrode face each other through a first detection driving arm, and wherein the second detection signal electrode and the second detection ground electrode face each other through a second detection driving arm.

6. A physical amount detecting apparatus comprising:

the physical amount detecting device according to claim 4;

a package in which the physical amount detecting device is housed; and an IC chip that is used for controlling the physical amount detecting device.

* * * * *